(No Model.) 2 Sheets—Sheet 1.
J. E. OFFUTT.
COMBINED HAY RAKE AND TEDDER.
No. 312,650. Patented Feb. 24, 1885.
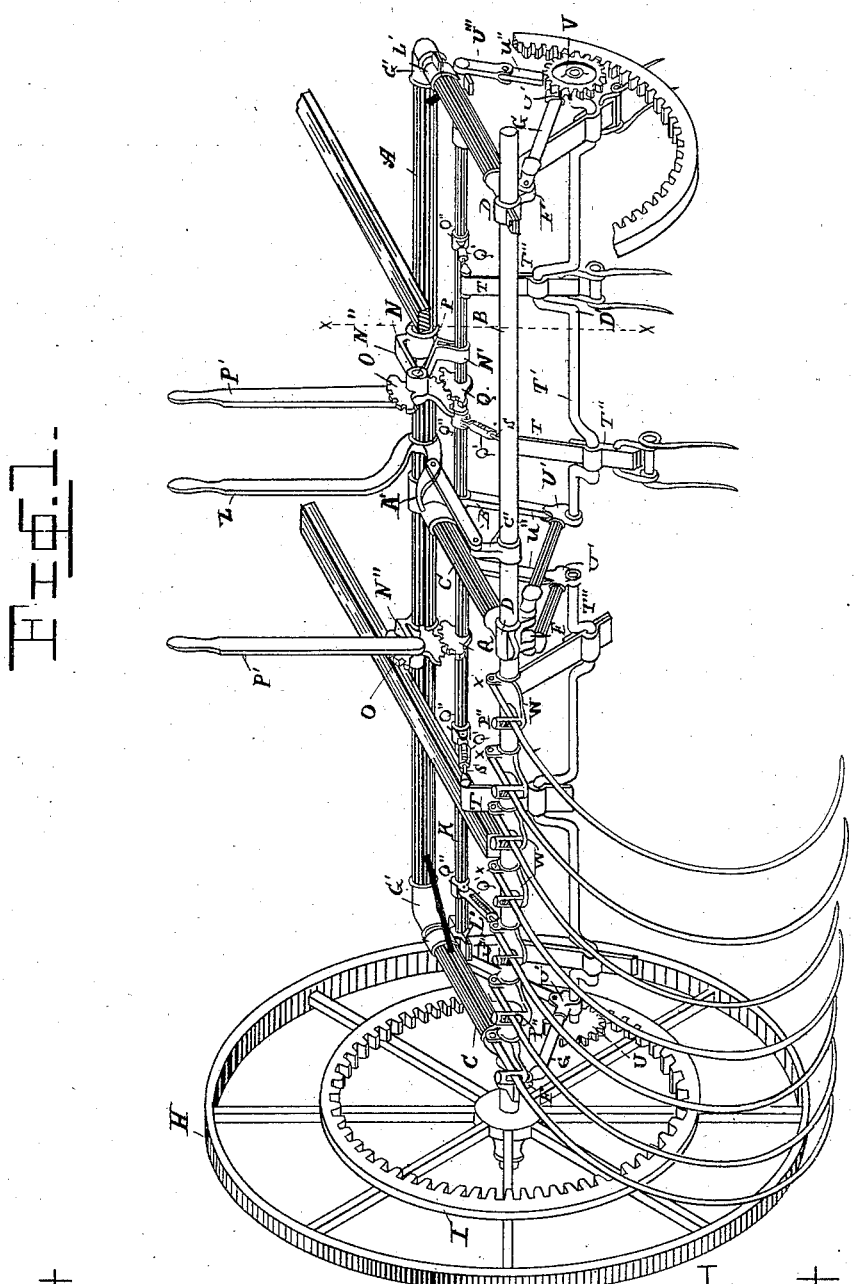
Attest
Edwin L. Bradford
C. W. H. Brown
Inventor
Joseph E. Offutt
By Toulmin & Jemmes

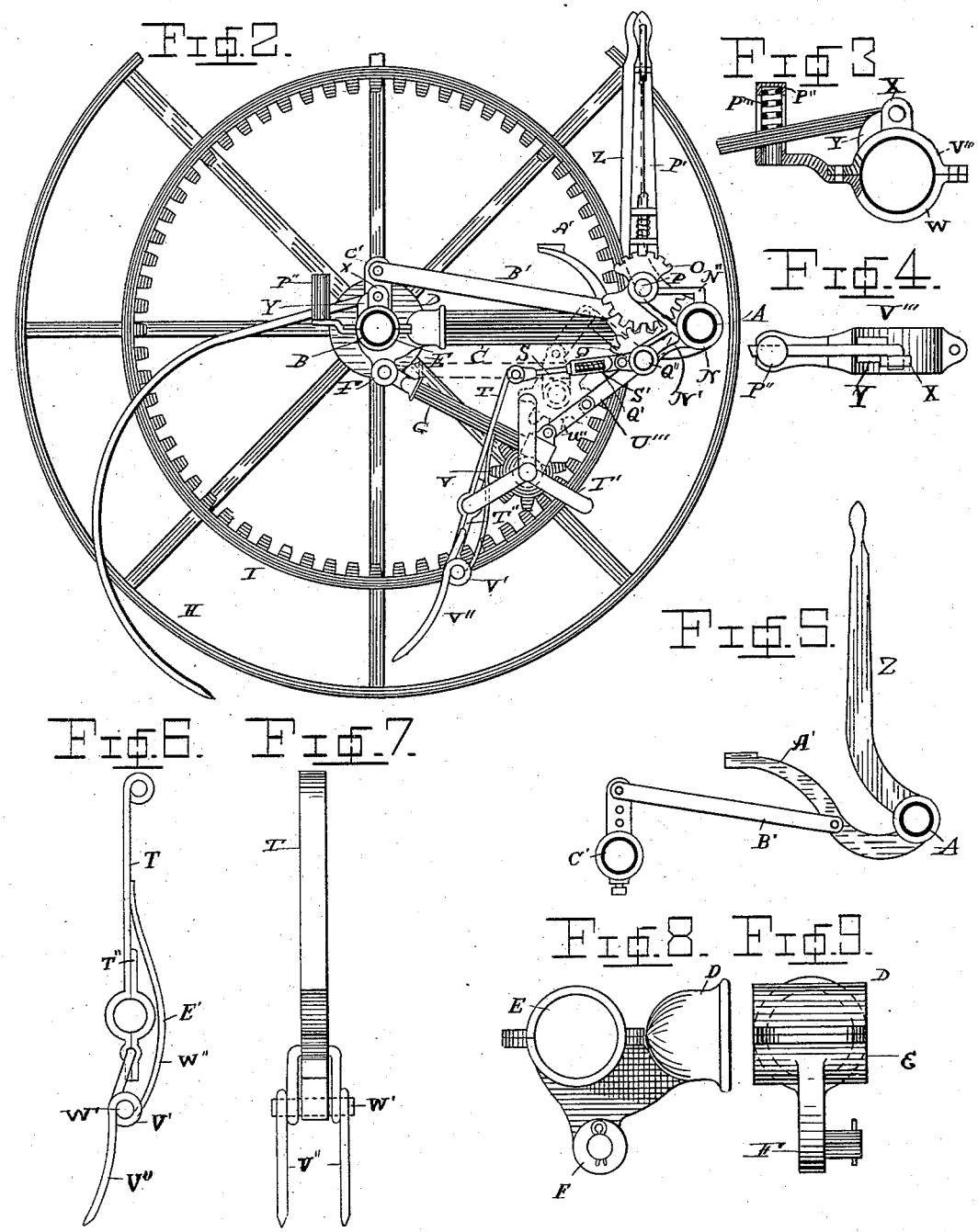

UNITED STATES PATENT OFFICE.

JOSEPH E. OFFUTT, OF SPRINGFIELD, OHIO, ASSIGNOR TO JOSEPH W. THOMAS, OF SAME PLACE.

COMBINED HAY RAKE AND TEDDER.

SPECIFICATION forming part of Letters Patent No. 312,650, dated February 24, 1885.

Application filed July 9, 1884. (No model.)

*To all whom it may concern:*

Be it known that I, JOSEPH E. OFFUTT, a citizen of the United States, residing at Springfield, in the county of Clark and State of Ohio, have invented certain new and useful Improvements in Combined Hay Rakes and Tedders, of which the following is a specification, reference being had therein to the accompanying drawings.

This invention relates to certain new and useful improvements in combined hay rakes and tedders; and it has for its objects, first, to provide a combined hay rake and tedder so constructed that either the rake or the tedder may be used independently of the other, and which, however, are adapted to be simultaneously operated when desired; second, to provide a combined hay rake and tedder in which either the tedder or raking mechanism may be thrown out of operation; and, third, to provide a combined hay rake and tedder in which the tedder mechanism is composed of or made up in sections, so that one or more of said sections may be thrown into action independently of the other or others.

In the accompanying drawings, forming a part of this specification, and on which like letters of reference indicate similar or corresponding features, Figure 1 represents a perspective view of my invention, having one of the supporting-wheels removed. Fig. 2 is a sectional view taken on the line $x$ $x$ of Fig. 1; Fig. 3, a sectional view of the rake-tooth coupling, showing the spring for holding the tooth in its normal position; Fig. 4, a plan view of the same; Fig. 5, a side elevation of the combined hand and foot lever for elevating the rake-teeth; Fig. 6, a side elevation of the tedder-fork and its arm; Fig. 7, a front view of the same; Fig. 8, a side elevation of the coupling for connecting the frame with the supporting-axle of the machine, and Fig. 9 an end view of the same.

The letter A designates the main frame of the apparatus, composed, preferably, of metallic tubing, having side and intermediate pieces, C, attached to the supporting-axle B.

I have constructed, as shown in Fig. 8, a coupling to be used for connecting the supporting-axle B with the tubular frame. This coupling is made, preferably, of cast metal, and is provided on one side with a cup-like portion, D, adapted to embrace the ends of the tubing, and on the other side with a bearing, E, of hemispherical form, adapted to receive the axle B, and having a cap of corresponding shape to fit over the upper half of said axle, the two portions being securely fastened together. The lower side of the coupling is slightly elongated, and provided with an opening, F, which receives a short horizontal extension of one of the arms G of the tedder-frame. The side and intermediate pieces of the frame are connected with the forward portion by elbow-couplings G'. The supporting-axle B is mounted in the supporting-wheels H, each of which is provided with a cog-wheel, I, on its inner side, the purpose of which will hereinafter appear.

Attached to the side pieces of the frame, near the forward part, is a rock-shaft, K, supported at either end in bearings secured to the two-part sleeves L', fitted on the said side pieces, and at its center by a T-shaped coupling, which also connects the intermediate and forward pieces of the frame together, said coupling terminating on its lower side in bearings for the reception of the shafts. The frame is also provided with couplings N N, having arms N' extending downwardly therefrom, which also serve as further supports for the respective sections of the rock-shaft K. Extending rearwardly from the upper portion of this coupling are also arms N'', which are provided with toothed segments O, and form bearings for the stud P of the levers P', terminating at their lower ends in toothed segments adapted to engage similar segments, Q, mounted on the respective sections of the rock-shaft K. As shown in Fig. 2, the levers P' are provided, respectively, with a detent adapted to be thrown in and out of gear with the segments O, and in that manner hold them wherever they may be set, the function of these levers being to operate the rock-shaft, whereby the tedder-teeth are elevated so as to pass over the hay.

The letter Q' refers to the connections between the upper ends of the tedder-arms and the shaft K, and they consist of bars provided with slots and pivotally connected with the couplings Q'', fitted on the shaft K. These bars are bored in a longitudinal direction to admit of the reception of the rods S, one end of which passes through the coils of the springs S', and are upset so that the springs press against them, and the other ends of which are pivotally connected with the upper ends of the tedder-arms T. It will be noticed that the springs afford a yielding connection between the tedder-forks and the shaft K, so that any liability to break, resulting from undue resistance to the teeth, is entirely obviated. The arms G are pivotally connected at one end with the extension F of the couplings D, and at the other they are rigidly connected with the couplings U', mounted on the respective sections of the tedder-shaft T'.

The letter U'' designates the other set of arms extending from the couplings U', the upper ends of these latter arms being pivotally connected with the arms U''', attached rigidly to the sections on the rock-shaft K. By this means the tedder-shaft T' is firmly supported or suspended, and yet rendered capable of being elevated by the operation of the levers P' and the several intermediate connections above alluded to.

The tedder-shaft T' is provided on its ends with pinions V, which intergear with the gear-wheels I, and thereby impart rotary motion to the said shaft. This shaft is divided into two sections corresponding with the respective sections of the rock-shaft K, and each section is provided with a suitable number of cranks mounted at proper angles to each other. To these cranks are connected the tedder-arms T, consisting of a thin strip of yielding metal, as steel, a strap, T'', being employed to maintain this connection, said arm and strap being bent, so as to receive the shaft and the tedder-tooth.

The letter V' designates the tedder-teeth, the same consisting of a rod bent into the form of the letter U to constitute the body of the tooth and terminating in the prongs V''', eyes being made therein by means of two coils of the rod. These teeth are connected at their upper ends with the arms T and the straps T''. Pins W', preferably of wood, are passed through the eyes, and connect with the yielding braces W'', secured at their upper ends to the arms T, whereby the teeth are made to perform their proper functions, and yet are capable of yielding.

In Figs. 3 and 4 is shown a sleeve consisting of the portions V'''' and W, which firmly embrace the supporting-axle B. The upper half is provided with a projection, X, having an aperture in it for the reception of the end of the rake-tooth, its end being bent at right angles to the main portion; and it is further provided with a bifurcated lug, Y, situated slightly in the rear of the projection X, the object of which is to prevent the lateral displacement of the tooth. The lower part of the sleeve extends backward, and terminates in a slotted cap-tube, P'', having a spiral spring, P''', located therein, beneath which the rake-tooth passes, the spring affording a yielding resistance for the tooth when the latter comes in contact with any obstruction. A series of these sleeves is placed along the supporting-axle, as represented in Fig. 1.

Attached to the main frame, and near the center of the machine, and within easy reach of the operator, is the hand and foot lever Z, constructed as shown in Fig. 5, the lower end of the lever fitting over the forward beam, A, of the frame, and having projecting therefrom an arm, A', provided with a foot-piece. A pitman, B', connects this arm to a short arm extending from a sleeve, C', rigidly fitted to the shaft B. By this arrangement the driver is enabled to use both his hand and foot at the same time, and it is thereby made easier to elevate the rake-tines.

It is to be observed that by reason of my improved device and arrangement, as above described, the tedding and raking mechanism may both be used at the same time, or either may be used independently of the other.

It is also observable that either section of the tedding mechanism may be used with the raking mechanism, or it may be used alone, according to the exigencies of the work to be performed.

Having thus fully described my invention, what I claim as new, and desire to secure by Letters Patent, is—

1. In a hay rake and tedder, the combination, with the supporting-axle and the main frame, of the rock-shaft, the tedder-shaft located below and forward of the supporting-axle, the arms and couplings connecting the tedder-shaft with the main frame and with the rock-shaft, and the means to actuate the rock-shaft.

2. In a combined hay rake and tedder, the combination, with the main frame and the supporting-axle and driving gear-wheel, of the rock-shaft, the tedder-shaft having pinions, the arms and the couplings connecting it to the rock-shaft, the tedder-arms carrying forks, and yieldingly connected with the rock-shaft, and the means to operate the rock-shaft.

3. In a combined hay rake and tedder, the combination, with the main frame, of the tedder-shaft situated below and forward of the supporting-axle, and divided into two or more sections, and the arms and the couplings for supporting said sections and connecting them with the main frame and with the rock-shaft.

4. In a combined hay rake and tedder, the combination, with the main frame and the supporting-axle, of the divided rock-shaft supported by the main frame, the divided tedder-shaft, and means for rotating the same, the arms and couplings supporting said shaft and connecting it with the supporting-axle and with the rock-shaft, the tedder-arms also connected to the rock-shaft, the segments, and the levers for operating the rock-shaft.

5. In a combined hay rake and tedder, the combination, with the main frame and the supporting-axle, of the two-part sleeves mounted on said shaft, the tines being pivoted to the upper of said parts, and the lower being provided with tubular tine-guides and pressure-springs.

6. In a combined hay rake and tedder, the combination, with the main frame and the supporting-axle, of the raking-tines, the two-part sleeves fitted upon said axle and provided with projections to which the teeth are pivoted, the bifurcated lugs, the slotted tubular guides and pressure-springs, and the hand and foot lever mounted upon the main frame and connected with the supporting-shaft, whereby the tines may be elevated.

7. In a combined hay rake and tedder, the combination, with the main frame, the supporting-axle, and wheels carrying driving-gears, the sleeves fitted upon said shaft having slotted tubular guides and pressure-springs, the tines connected thereto, and the foot and hand lever connected to the main frame and with said shaft, of the divided rock-shaft, the segments and engaging levers, the tedder-shaft carrying pinions, and the arms and the coupling connecting the same with the rock-shaft and the supporting-axle, the tedder-arms carrying tedder-forks, and yieldingly connected with the rock-shaft sections.

8. In a combined hay rake and tedder, the combination, with the rock-shaft, of the thin flat yielding tedder-arms carrying the tedder-teeth, and the longitudinally-yielding connections connecting the upper ends of said arms with the rock-shaft.

9. In a combined hay rake and tedder, the combination, with the thin flat tedder-arms carrying tedder-teeth, of the sleeves mounted on the rock-shaft, the slotted bars pivotally connected with said sleeves, the spiral springs fitted within said slots, and the rods connecting with the tedder-arms and engaged by said springs.

10. In a combined hay rake and tedder, the combination, with the yielding or flexible tedder-arm, of the tedder-teeth pivotally connected therewith, and a yielding brace connected with the arm and the teeth.

11. In a combined hay rake and tedder, the combination, with the yielding tedder-arm having semicircular bends therein, and the strap having corresponding bends, of the tooth having a U-shaped body, eyes formed therein, and yielding prongs, and the brace and pin connecting with the arm and tooth.

In testimony whereof I affix my signature in presence of two witnesses.

JOSEPH E. OFFUTT.

Witnesses:
  F. STATS,
  WILBER COLVIN.